United States Patent [19]

Cox, Jr.

[11] Patent Number: 4,700,618
[45] Date of Patent: Oct. 20, 1987

[54] MEAT SMOKER

[75] Inventor: David M. Cox, Jr., 1522 N. Hardrock Rd., Irving, Tex. 75061

[73] Assignee: David M. Cox, Jr., Irving, Tex.

[21] Appl. No.: 762,957

[22] Filed: Aug. 6, 1985

[51] Int. Cl.$^4$ .......................... A21B 1/24; A47J 37/04; A23B 4/04

[52] U.S. Cl. ........................................ 99/339; 99/340; 99/447; 99/481; 99/482; 126/25 R; 126/79

[58] Field of Search .................. 99/339, 340, 446, 447, 99/467, 479, 473, 474, 482, 481; 126/25 R, 21 A, 25 A, 79, 9 R, 18

[56] References Cited

U.S. PATENT DOCUMENTS

| | | | |
|---|---|---|---|
| 3,380,444 | 4/1968 | Stalker | 126/9 R |
| 3,477,360 | 11/1969 | Raney | 99/339 |
| 3,623,423 | 11/1971 | Berger | 99/446 |
| 3,882,767 | 5/1975 | Oyler et al. | 99/339 |
| 4,348,948 | 9/1982 | Allison | 99/482 X |

Primary Examiner—Timothy F. Simone

[57] ABSTRACT

A meat smoker is provided in a portable cooking unit having a fire box (14) and a smoker oven (12) vertically and laterally offset from the fire box. Smoker oven (12) defines an upper enclosed volume (94) containing meat to be cooked and a lower enclosed volume (96) which opens directly to the fire box (14). A hot pan drain wall (52) is provided to separate the upper volume (94) from the lower volume (96). An adjustable damper (62) is provided between the upper volume (94) and the fire box (14) to control the temperature and the smoke density within the upper volume (94). A top (40) may be placed over an opening in the fire box (14) and having a heating plate (28) to define an oven volume (16) for radiant heat input. An ash receptacle (34) is provided having stable lifting means for removal and replacement during operation of the fire box (14).

14 Claims, 3 Drawing Figures

MEAT SMOKER

BACKGROUND ART

One conventional class of barbecue devices provides a heating compartment which raises air to a temperature effective for convective cooking of foods located in an adjacent compartment. The adjacent cooking compartment may be located vertically or laterally of the heating compartment. All of the heated air generally passes over the food and exits through a stack having a damper for regulating the output air flow.

U.S. Pat. No. 3,561,348 shows many features of a conventional convective barbecue oven. Inlet air is heated by a fire for convective heating of the meat in an oven unit located beside a fire box. The heated air exits through a smoke stack having an internal damper for controlling air flow. Meat drippings may be returned to the fire to assist in flavoring the meat. The total air inlet and outlet flow may be regulated over the meat to control the rate of cooking to allow for unattended continuous cooking.

Yet another apparatus is shown in U.S. Pat. No. 3,991,666 which shows a vertical displacement of the meat racks above a fire box. A grill is disposed directly above the fire for cooking foods using direct radiant and conductive heat from the fire. A damper plate is provided to direct some heat about a pan collecting drippings from the meat and thereafter to the cooking chamber.

Conventional barbecue units generally incorporate various features shown in the above barbecue units. In these units, the meat is cooked by convection of the heated air which generally also contains smoke products. Further, flavoring from the meat drippings is obtained when the drippings fall into the fire and this flavoring frequently has a scorched taste. Further, no provision is made to further utilize the radiant energy from fire in the fire box, although occasional direct application to a grill is provided for cooking. Since smoking may consume several hours, it would be desirable to make further cooking use of the heat developed by the fire.

Many conventional smoking apparatus also require the addition of moisture in the smoking chamber to keep the meat from drying out. This is not generally desirable and is frequently not a successful approach.

These and other problems of the prior art are overcome by the present apparatus wherein an improved device is provided for slowly cooking meats in a chamber remote from a fire box while enabling cooking to be done directly over the fire in the fire box.

SUMMARY OF THE INVENTION

A meat smoker is provided in a portable cooking unit having a fire box and a smoker oven vertically and laterally offset from the fire box. The smoker oven defines an upper enclosed volume containing meat to be cooked and a lower enclosed volume which opens directly to the fire box. A hot pan drain wall is provided to separate the upper volume from the lower volume. An adjustable damper is provided between the upper volume and the fire box to control the temperature and the smoke density within the upper volume.

In one embodiment, an opening is provided above the fire box which is sealed with a bottom heating plate for receiving heat radiated from within the fire box and which is movable from a first closed position above the fire which seals the opening to a second open position adjacent the fire box opening. A top is placed over the heating plate and defines an oven volume. Damper apparatus is included in the oven top for controlling ambient air flow through the oven to regulate temperature within the oven volume.

In another embodiment of the present invention, an improved ash receptacle is provided beneath the fire box. The ash receptacle may be removed during the cooking process, when necessary, by sliding an ash box from beneath the fire. A front gripping handle is provided having a structure which maintains a temperature which can be manually grasped for removing the ash box. A rear gripping means is provided which accepts a poker hook as the ash box is being slidably removed from the first box. In this manner, two supports are provided for stably lifting the ash box, which may contain hot ashes or may be heated from the fire above the ash box.

A barbecue smoking process is provided using a fire formed in a first chamber, adding air to the first chamber to form a heated air flow and directing the heated air into a smoking chamber. A first portion of the heated air is passed through a bypass chamber and beneath a drip pan. A second portion of the heated air is controlled by a damper for entry to a cooking chamber. The second portion of the heated air, if used, is admitted above the drip pan and about the meat to assist in controlling the cooking temperature in the cooking chamber.

These and other features and advantages of the present invention will become apparent from the following detailed description, wherein reference is made to the attached drawings.

DETAILED DESCRIPTION

Figure 1:
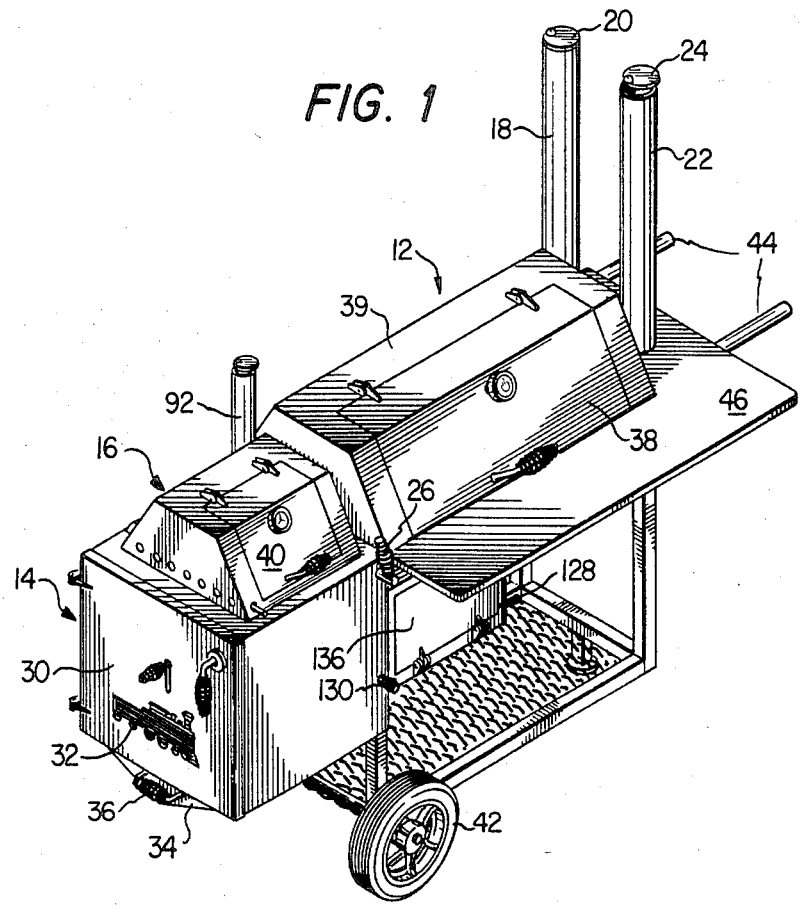
FIG. 1 is a schematic illustration of a portable cooking unit according to one embodiment of the present invention.

Referring now to FIG. 1, there is shown an isometric view of a portable cooking unit according to one embodiment of the present invention. Portable cooking unit 10 is provided with a smoker oven section 12 and fire box 14 which is laterally and vertically displaced from smoker oven 12. Fire box 14 further includes top oven 16 above fire box 14.

Smoker oven 12 provides interior access through door 38. First smoke exit, chimney 20, includes first regulator 20 for air flow control. Likewise, second smoke exit, chimney 22, includes regulator 24 for control. First chimney 18 and second chimney 22 are connected with respective cooking volumes within smoker 12, as hereinafter discussed.

Fire box 14 provides air inlet 32 in fire box door 30 for input air which is to be heated. Ash receptacle 34 is provided beneath fire box 14 and front handle 36 assist in removing receptacle 34 for emptying.

Damper handle 26 controls heated air distribution to the internal volumes of smoker oven 12. The action of the damper control by handle 26 cooperates with first regulator 20 and second regulator 24 to control cooking temperatures within smoker 12.

To further enhance portability of cooking unit 10, handles 44 are provided to pivot the unit about wheels 42 for movement. Horizontal surface 46 is conveniently provided about smoker enclosure 39 to hold cooking utensils, food ingredients, etc.

Oven chamber 128 may also be provided beneath smoker oven 12 and adjacent fire box 14 to provide low temperature cooking and/or warming. Heat from fire box 14 is diverted through oven 128 and can be regulated by slide control 130. Access to oven 128 is provided through door 136 which is conveniently located beneath horizontal work surface 46. Closeable port 138 is provided to assist in cleaning oven 128.

Figure 2:
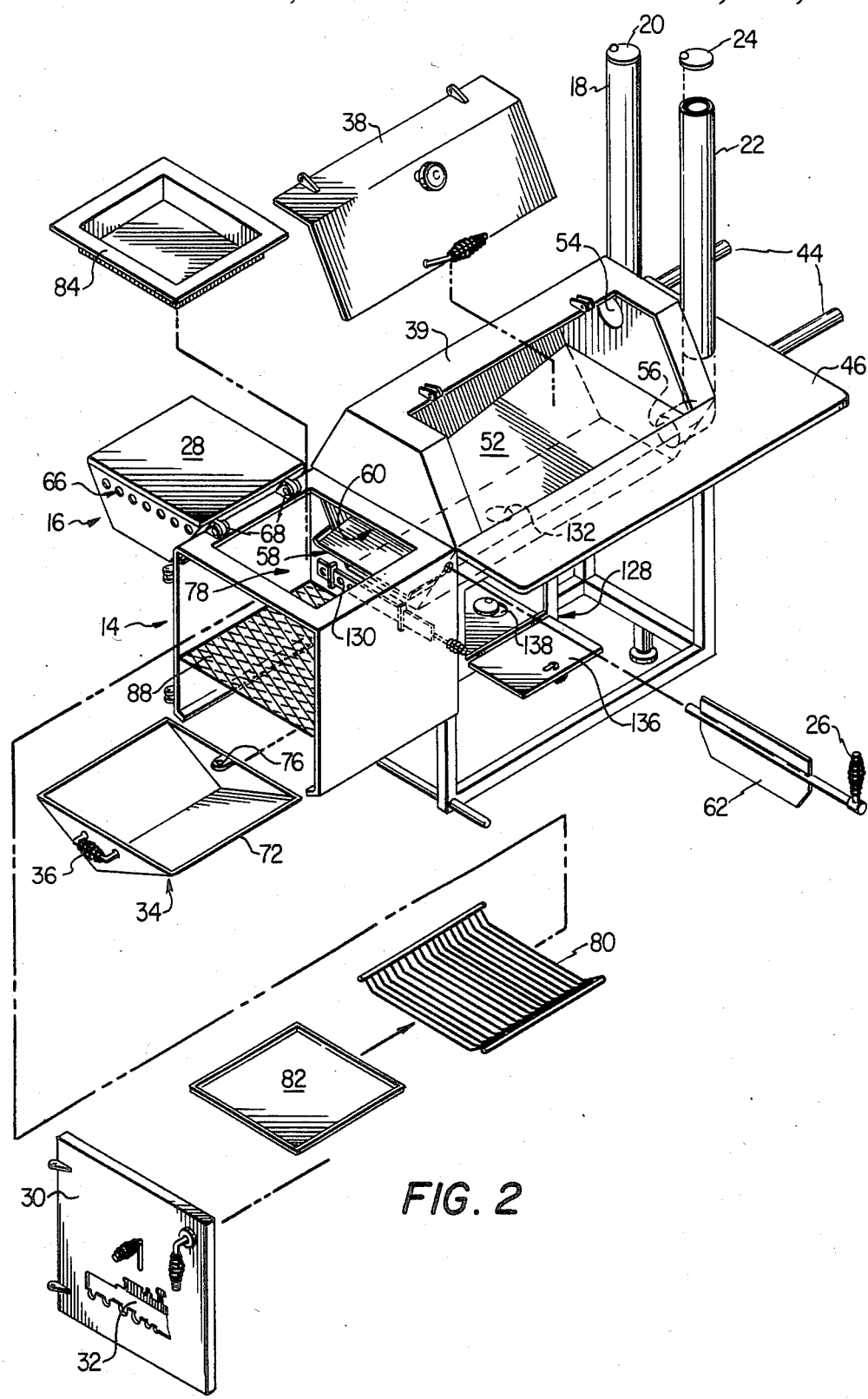
FIG. 2 is an exploded view of the apparatus shown in FIG. 1 more particularly showing the internal arrangement.

FIG. 2 is an expoded view, in partial cutaway, showing components and assembly of portable cooking unit 10 (FIG. 1).

Smoker enclosure 39 defines an internal volume which is bisected by hot pan drain 52 into an upper volume 94 and a lower volume 96, more particularly discussed with reference to FIG. 3. Heated air in the upper volume exits through first exit port 54, through first chimney 18, with exit control by first regulator 20. The volume beneath hot pan drain 52 includes second exit port 56 which is connected through second chimney 22 and second regulator 24 to control heated air exit from the lower volume.

Fire box 14 is adjacent smoker enclosure 39. Heated air produced within fire box 14 has access to the volume defined by smoker enclosure 39 through upper opening 60 above hot pan drain 52 and through lower opening 58 to the lower bypass volume below hot pan drain 52.

As shown in FIG. 2, damper 62 is mounted within upper opening 60. Damper handle 26 is mounted for exterior access to control the position of damper 62 within upper opening 60 for cooking control, as explained with reference to FIG. 3.

Fire box 14 defines top opening 78 for use with an auxiliary cooking system used directly above fire grate 88, holding materials forming the fire.

Beneath fire grate 88 is improved ash receptacle 34 which is slidably mounted on fire box 14 beneath fire grate 88. Ash receptacle 34 includes ash box 72 for collecting ash residue from the fire on fire grate 88. Forward handle 36 enables ash box 72 to be slidingly moved within fire box 14. According to one embodiment of the present invention, ash box 72 is provided with a means for grasping ash box 72 during operation of fire box 14. As shown in FIG. 2, a rear poker eye 76 is mounted on the rear wall of ash box 72. As ash box 72 is moved forward with front handle 36, rear eye 76 becomes accessible. Rear eye 76 conveniently accepts a conventional fire poker iron (not shown) so that ash box 72 is stably handled by the poker iron engaging rear eye 76 while front handle 36 is grasped.

A cooking system is provided for use with fire box 14. Top oven 16 is mounted on hinges 68 for rotating above top opening 78 to expose heated plate 28 to the fire on grate 88. Top oven 16 includes damper 66 to admit ambient air to the oven interior for temperature control. Top oven 16 may be rotated away from top opening 78 on hinges 68 and may conveniently rotate to a position where heated surface 28 is substantially horizontal, forming a work surface adjacent top opening 78.

Grill 80 is provided with the cooking system for slidably mounting within top opening 78. In one embodiment of the present cooking system, grill 80 further defines a recessed area beneath top opening 78 to receive slide-in skillet 82. Skillet 82 may be used for materials which are not suitable for grilling.

It will also be seen from FIG. 2 that grill 80 and skillet 82 may be installed when top oven 16 is rotated above top opening 78. Skillet 82 then acts to provide yet another temperature control for top oven 16 by shielding heated plate 28 from direct radiation from the fire in fire box 14. With skillet 82 in place, top oven 16 may conveniently be regulated to a temperature around 175° F., which provides a temperature for warming food materials.

In one other embodiment, a deep frying container 84 is provided for use within top opening 78. When top oven 16 is rotated out of top opening 78 and grill 80 with skillet 82 are slidably removed from within top opening 78, deep frying container 84 may be inserted within top opening 78 for support by the edge portions of fire box 14 defining top opening 78. By regulating air flow through air inlet 32 and fire box door 30, and heated air exit through chimneys 18 and 22, the temperature within deep fry container 84 may be controlled, with temperatures ranging from less than 700° F. to temperatures of 1100° F. Thus, the grease within deep frying container 84 can be maintained at a frying temperature for use in deep fat frying a variety of food products.

Further, low temperature and/or warmer oven chamber 128 may be located beneath smoker enclosure 39 and adjacent fire box 14. Heat control 130 is slidably arranged beneath lower opening 58 for opening into fire box 14 above grate 88. Heat exits directly from oven 128 through port 132. Oven door 136 opens beneath horizontal surface 46 for access to the interior of oven 128 during cooking or for cleaning oven 128 through clean-out port 138.

Figure 3:
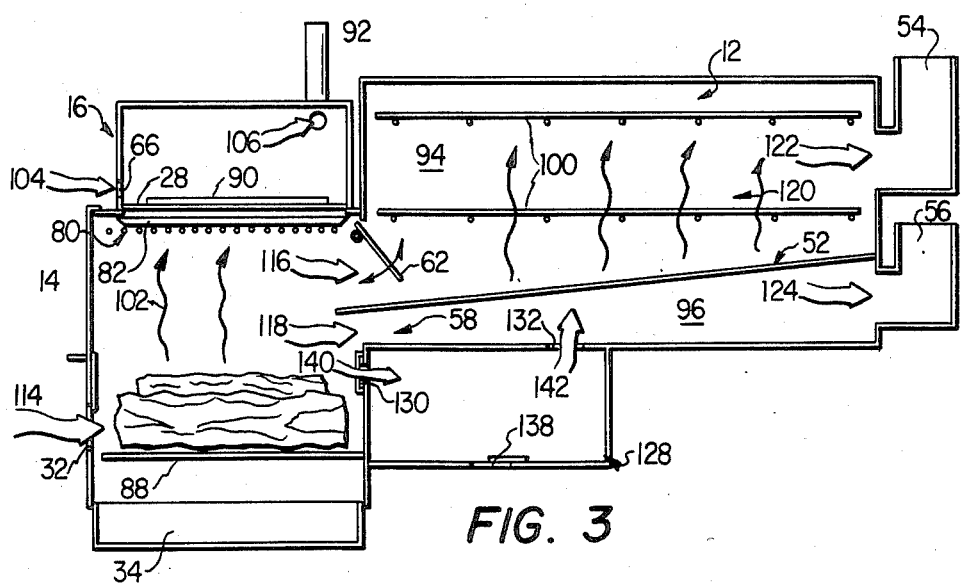
FIG. 3 is a schematic cross section illustrating the relative positions of the cooking areas and the heat flows to the cooking areas.

Referring now to FIG. 3, there is shown in cross-sectional schematic a representation of the cooking effects which can be obtained from the portable cooking unit. A fire is formed in fire box 14 on fire grate 88 above ash box 34. Air 114 for the fire is admitted through air inlet 32 which is controllable as a first regulating mechanism. Heat from the fire in fire box 14 includes radiant heat 110 directed toward the top of fire box 14.

Radiant heat 102 heats portions of the cooking system installed above fire grate 88, including grill 80, skillet 82, if installed, and heated plate 28 of top oven 16. Skillet 82 may be installed to reflect radiant heat 102 back within fire box 14 and provide a first control to the interior of top oven 16. Radiant heat 102 is absorbed by heated plate 28 and conducted to the interior of top oven 16 for use in heating and/or cooking food items.

Damper 66 controls the flow of ambient air 104 to within the oven interior. Oven chimney 92 is provided with a damper to control the flow of heated air from within top oven 16. An oven rack 90 may be provided above heated surface 28 to prevent burning food items placed directly on heated plate 28. Temperature control of top oven 16 is provided by controlling the flow of cooling air through the oven volume. Temperatures within oven 16 can obtain 400°–500° F. when cooling air flow 104 is substantially damped through damper 66.

Heat from fire box 14 is also transferred through convective air flow, smoker air flow 116, through smoker volume 94 defined by the upper volume in smoker oven 12 above hot pan drain 52. Damper 62 controls admittance of smoker air flow 116 to smoker volume 94.

Bypass volume 96 in the lower volume of smoker 12 beneath hot pan drain 52 receives bypass air flow 118 through lower opening 58 which is continuously opened to fire box 14. Control of smoker air flow 116 and bypass air flow 118 is further controlled by first exit 54 and second exit 56, respectively.

Thus, smoker volume 94 may be operated as a conventional oven by closing damper 62 and regulator 20 of chimney 18 connected with exit port 54 (see FIG. 2). Heated air flow 118 beneath hot pan drain 52 heats pan 52 which thereafter radiates heat 120 to the upper smoker volume 94. In this configuration, grease from meat cooking in smoker volume 94 can drip onto the hot pan drain 52 surface which produces a sizzling effect for the grease to produce a vapor which enhances the flavor of the meat being cooked.

Damper 62 may also be open to admit smoke from the fire in fire box 14 to upper volume 94 to obtain smoke flavoring in the meat being cooked. Now, grease dripping onto hot pan drain 52 can sizzle and can also run down the inclined drain 52 onto the fire in fire box 14 to further flavor the smoke from the fire and enhance the flavor of the meat. It is noted from FIG. 3 that hot pan drain 52 extends into fire box 14 to drain grease into the hot fire portion.

Oven chamber 128 is arranged adjacent fire box 14 to admit heated air directly into oven 128. Sliding heat control 130 is spaced below lower opening 58 and generally adjacent the fire in fire box 14. Heated air 140 is controllably admitted into oven 128 through slide control 130. Exit air 142 passes through outlet port 132 into bypass volume 96 for exhaust through bypass exit 124. A closeable port 138 is provided to assist in cleaning the interior of oven 128.

Smoker enclosure 39 (FIG. 2) forming smoker oven 12 volume is preferably constructed of a thick metal plate, such as ¼" steel. It has been found that steel plate of this thickness assists in maintaining moisture within smoker oven 12 volume to obviate the need to provide additional moisture within the cooking volume. Ambient air flow adjacent enclosure 39 tends to cool enclosure 39 and produce a gradient through the thickness of enclosure 39 which assists in condensing moisture in the heated air within smoker oven 12, and particularly upper volume 94. Water, as a combustion product, adds substantial moisture to air 114 which is directed to the fire. This moisture then tends to condense on the relatively cooler surfaces of enclosure 39 (FIG. 1). The moisture condensation within the smoker volume 94 assists in maintaining the meat being cooked in a moist condition.

Referring again to FIG. 1, it will now be appreciated that the overall weight of portable cooking unit 10 may exceed 700 pounds with the ¼" steel plate. However, by balancing smoker section 12 and fire box 14, the unit may be pivoted about wheels 42 with an upper pressure on handles 44, which may only be about 30 pounds because of the lever arm provided. Conversely, fire box 14 obtains a short lever arm so that an inadvertent pressure on fire box 14 will not easily tip portable cooking unit 10.

It is therefore apparent that the present invention is one well adapted to attain all of the characteristics hereinabove set forth together with other characteristics, advantages, and features which will become obvious and inherent from a description of the product and process. It will be understood that certain combinations and subcombinations are of utility and may be obtained without reference to other features and subcombinations. This is contemplated by and is within the scope of the present invention.

I claim:

1. A meat smoker comprising:
   a fire box;
   a smoking chamber vertically and laterally offset from said fire box;
   a heating chamber positioned below said smoking chamber and adjacent to said fire box, said heat chamber being open to said fire box to receive heated air from said fire box;
   a drain pan separating said smoking chamber and said heating chamber, a portion of said drain pan extending into said fire box, and said drain pan being of such material and thickness to facilitate a transfer of heat from said heating chamber to said smoking chamber; and
   an adjustable damper connecting said smoking chamber with said fire box for controlling the flow of smoke and heated air from said fire box into said smoking chamber.

2. A meat smoker according to claim 1, wherein said drain pan is inclined upwardly from said fire box.

3. A meat smoker according to claim 1, further comprising:
   a first regulated chimney connected with said smoking chamber and a second regulated chimney connected with said heating chamber.

4. A meat smoker according to claim 3 wherein said damper and said first and second regulated chimneys cooperate to enable convective heating of said drain pan to a temperature effective to sizzle material dripped from meat in said smoking chamber.

5. A meat smoker according to claim 1, wherein the walls surrounding said smoking chamber have a thickness effective to establish a cooling gradient such that moisture in the heated air from said fire box condenses on the inside of the walls of said smoking chamber.

6. A meat smoker according to claim 1, further comprising a top oven positioned directly above said fire box, said oven including:
   a heating plate positioned between said fire box and said oven for receiving heat radiated from said fire box and said heating plate facilitating the transfer of heat between said fire box and said oven;
   a plurality of walls defining a closed volume above said heating plate; and
   a damper and exhaust means for controlling ambient air flow through said oven in order to regulate the temperature within said oven.

7. A meat smoker according to claim 1, further comprising:
   a side oven positioned adjacent to said fire box and having an adjustable damper for admitting heated air from said fire box and exhaust means for exhausting air from said side oven.

8. A meat smoker according to claim 1, further comprising an improved ash receptacle including:
   an ash box slidably mounted in the bottom of said fire box;
   front gripping means for supporting said ash box in removing it from the fire box, said gripping means being mounted on said ash box and extending from said fire box in such a manner as to maintain a temperature suitable for handling during operation of said smoker; and rear gripping means for supporting said ash box as it is removed from said fire box.

9. A meat smoker according to claim 6, further comprising a grill slidable beneath said heating plate.

10. A meat smoker according to claim 9 further comprising a skillet slidable between said grill and said heating plate.

11. A meat smoker comprising:

a fire box;

a smoking chamber vertically and laterally offset from said fire box;

a heating chamber positioned below said smoking chamber and adjacent to said fire box, said heating chamber being open to said fire box to receive heated air from said fire box;

a drain pan separating said smoking chamber and said heating chamber, and said drain pan acting to facilitate the transfer of heat from said heating chamber to said smoking chamber;

an adjustable damper connecting said smoking chamber with said fire box;

a first regulated chimney connected with said smoking chamber;

a second regulated chimney connected with said heating chamber;

said first and second regulated chimneys cooperating with said damper to enable heating of said smoking chamber;

a top oven positioned above said fire box;

a heating plate positioned between said fire box and said top oven; and an ash box slidably mounted within the bottom of said fire box for receiving ashes from said fire box, said ash box being removable during operation of the smoker.

12. A meat smoker according to claim 11, further comprising a side oven positioned adjacent to said fire box and having an adjustable damper for admitting air from said fire box.

13. A meat smoker according to claim 12 further comprising a grill slidable beneath said heating plate.

14. A meat smoker according to claim 13 further comprising a skillet slidable between said grill and said heating plate.

* * * * *